J. Leffel,

Water Wheel.

No. 3,169.

Reissued Oct. 27. 1868.

Witnesses;
W. H. Whitney
J. R. Dodge

Inventor;
James Leffel
By Smith & Dodge
Attorneys

N. PETERS, PHOTO-LITHOGRAPHER, WASHINGTON, D. C.

UNITED STATES PATENT OFFICE.

JAMES S. GOODE AND JOHN W. BOOKWALTER, OF SPRINGFIELD, OHIO, EXECUTORS OF THE ESTATE OF JAMES LEFFEL, DECEASED.

IMPROVEMENT IN WATER-WHEELS.

Specification forming part of Letters Patent No. 34,150, dated January 14, 1862; reissue No. 1,791, dated October 11, 1864; reissue No. 3,169, dated October 27, 1868.

DIVISION B.

*To all whom it may concern:*

Be it known that JAMES LEFFEL, of Springfield, in the county of Clarke and State of Ohio, have invented a new and useful Improvement in Water-Wheels, and guides thereto; and we do hereby declare that the following is a full, clear, and exact description of the same, reference being had to the annexed drawings, making part of this specification, in which—

Figure 3:
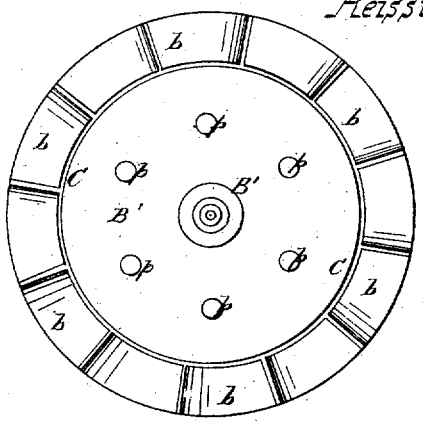
Figure 2:
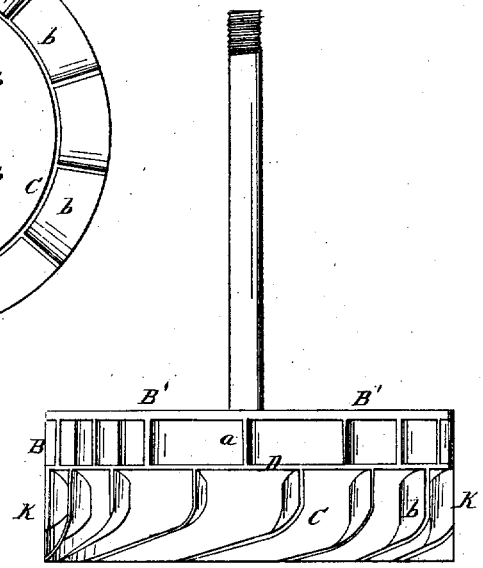
Figure 4:
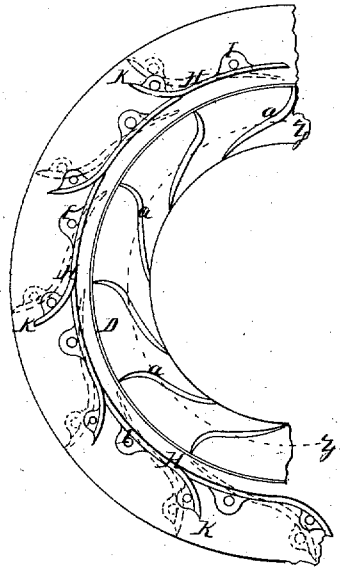
Figure 1:
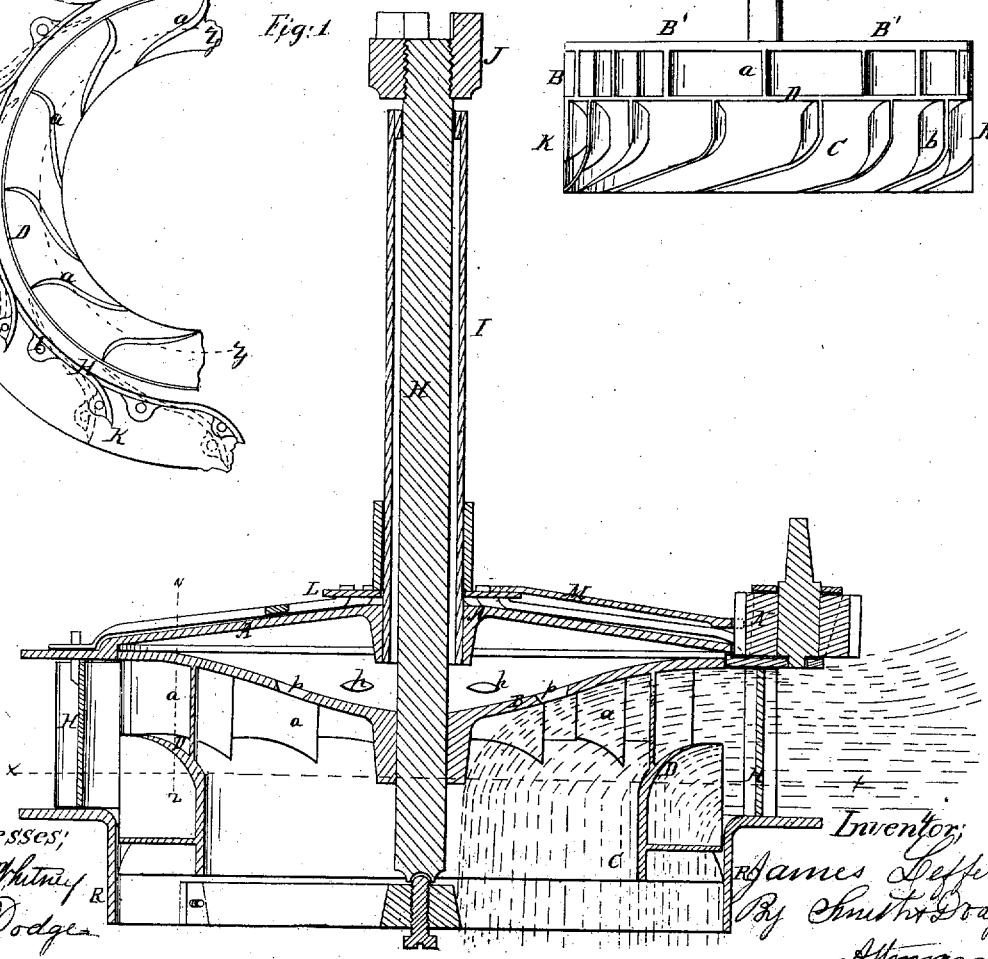

Figure 1 is a vertical section of the wheel and case. Fig. 2 is a side elevation of the wheel. Fig. 3 is a plan view of the wheel from below; and Fig. 4 is a top-plan view of a portion of the wheel and case, with the top of each removed, so as to show the position of the upper tier of buckets, and of the gates in the casing surrounding the same.

The same letters are employed in all the figures for the indication of the same parts.

This invention consists in the combination of a water-wheel, having two series of buckets placed one over the other, and a series of chutes for directing the water to the said buckets.

The wheel represented in the annexed drawings is formed with two series of buckets, of which the upper series, *a*, are centrally-discharging, and the lower series, *b*, are vertically-discharging, buckets. Both series of buckets receive the water horizontally, the water acting upon vertical vanes, constructed as shown. B is the top plate of the wheel, and D is an annular diaphragm, which separates the upper and lower series of buckets.

It is not necessary to set forth herein fully all that relates to a complete description of the wheel, this having been done in another subdivision, filed herewith, in which said wheel is fully described, reference being made to said specification.

The water is directed horizontally upon said buckets through a series of guides formed by vertical plates, H, which are placed between the peripheral flange of the plate A, which covers the wheel, as shown clearly in Fig. 1, and the horizontal flange of the tube R. Said tube incloses the lower part of the wheel, and is constructed with a horizontal flange, upon which the wheel and casing may be supported on the floor of the fore-bay. The water can only enter the buckets of the wheel in a horizontal line, as directed by said guides. The form in which it is preferred to make these guides is clearly shown in Fig. 4. The guides are attached by pivots, at I, to the lower and upper flange, so that they may be turned simultaneously by a series of arms connected thereto.

This mode of operation will be more fully explained in another subdivision of this application, to which reference is made.

These guides are also gates, so that, turning upon their pivots, they regulate the quantity as well as control the direction of the water. They may be used to completely shut off the water from the wheel.

What we claim as the invention of the said JAMES LEFFEL, and desire to secure by Letters Patent, is—

In combination with a water-wheel having two series of buckets, an upper plate, covering the wheel, with a horizontal flange, and a lower cylinder and flange, and a series of chutes for directing the water to said buckets, substantially as described.

In testimony whereof we have signed our names to this specification before two subscribing witnesses.

JAMES S. GOODE.
JOHN W. BOOKWALTER.

Witnesses:
R. MASON,
T. C. CONNOLLY.